US012391621B2

(12) United States Patent
Matsui et al.

(10) Patent No.: US 12,391,621 B2
(45) Date of Patent: Aug. 19, 2025

(54) SINTERED BODY, POWDER AND METHOD FOR PRODUCING THE SAME

(71) Applicant: TOSOH CORPORATION, Yamaguchi (JP)

(72) Inventors: Koji Matsui, Yamaguchi (JP); Kohei Hosoi, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 888 days.

(21) Appl. No.: 17/605,332

(22) PCT Filed: Apr. 6, 2020

(86) PCT No.: PCT/JP2020/015468
§ 371 (c)(1),
(2) Date: Oct. 21, 2021

(87) PCT Pub. No.: WO2020/217942
PCT Pub. Date: Oct. 29, 2020

(65) Prior Publication Data
US 2022/0212999 A1 Jul. 7, 2022

(30) Foreign Application Priority Data

Apr. 25, 2019 (JP) ................. 2019-084550
Aug. 1, 2019 (JP) ................. 2019-142437
Nov. 25, 2019 (JP) ................. 2019-211944

(51) Int. Cl.
*C04B 35/488* (2006.01)
*C04B 35/64* (2006.01)

(52) U.S. Cl.
CPC .......... *C04B 35/4885* (2013.01); *C04B 35/64* (2013.01); *C04B 2235/3217* (2013.01); *C04B 2235/3225* (2013.01); *C04B 2235/3246* (2013.01); *C04B 2235/3287* (2013.01); *C04B 2235/3418* (2013.01); *C04B 2235/5409* (2013.01); *C04B 2235/5445* (2013.01); *C04B 2235/5454* (2013.01); *C04B 2235/549* (2013.01); *C04B 2235/762* (2013.01); *C04B 2235/765* (2013.01); *C04B 2235/96* (2013.01)

(58) Field of Classification Search
CPC ................ C04B 35/4885; C04B 35/64; C04B 2235/3217; C04B 2235/3225; C04B 2235/3246; C04B 2235/3287; C04B 2235/3418; C04B 2235/5409; C04B 2235/5445; C04B 2235/5454; C04B 2235/549; C04B 2235/762; C04B 2235/765; C04B 2235/96
See application file for complete search history.

(56) References Cited

U.S. PATENT DOCUMENTS

| 4,626,517 A | 12/1986 | Watanabe et al. |
| 4,977,114 A | 12/1990 | Horinouchi et al. |
| 5,180,696 A | 1/1993 | Inoue |
| 6,087,285 A * | 7/2000 | Oomichi ............... B82Y 30/00 501/103 |
| 2004/0192535 A1* | 9/2004 | Tanaka ................... C01G 25/02 501/103 |
| 2017/0362129 A1 | 12/2017 | Hirota et al. |
| 2020/0317581 A1 | 10/2020 | Ito |
| 2022/0135486 A1* | 5/2022 | Kudo ..................... C04B 35/64 252/301.4 R |

FOREIGN PATENT DOCUMENTS

| CN | 1526683 A | 9/2004 | |
| CN | 106170465 A | 11/2016 | |
| EP | 1 437 333 A1 | 7/2004 | |
| JP | 59-182270 A | 10/1984 | |
| JP | H1081957 A * | 3/1998 | |
| JP | 11-240757 A | 9/1999 | |
| JP | 2003128461 A * | 5/2003 | ............. B82Y 30/00 |
| JP | 2004-075425 A | 3/2004 | |
| JP | 2011-178610 A | 9/2011 | |
| JP | 2015221727 A * | 12/2015 | |
| JP | 2017-226555 A | 12/2017 | |
| WO | 2018/056330 A1 | 8/2019 | |

OTHER PUBLICATIONS

JP2003128461A machine translation (Year: 2003).*
JP2015221727 machine translation (Year: 2015).*
JPH1081957A machine translation (Year: 1998).*
International Search Report issued in International Patent Application No. PCT/JP2020/015468, dated Jun. 16, 2020, along with an English translation thereof.
International Preliminary Report on Patentability in International Application No. PCT/JP2020/015468, dated Jun. 16, 2020, along with an English translation thereof.
Matsui et al. "Grain-boundary structure and microstructure development mechanism in 2-8 mol% yttria-stabilized zirconia polycrystals", ACTA Materiala, Elsevier, Oxford, GB, vol. 56, No. 6, Jan. 14, 2008, pp. 1315-1325, XP022514464, ISSN 1359-6454, DOI:10.1016/J.ACTAMAT. 2007.11.026.

(Continued)

*Primary Examiner* — Amber R Orlando
*Assistant Examiner* — Cameron K Miller
(74) *Attorney, Agent, or Firm* — GREENBLUM & BERNSTEIN, P.L.C.

(57) ABSTRACT

There is provided a raw material for a zirconia sintered body formed by pressureless sintering and having a high fracture toughness value measured by an SEPB method, a sintered body formed from the raw material, and a method for producing at least one of the raw material and the sintered body. Also provided is a sintered body that includes zirconia that contains a stabilizer and having a monoclinic fraction of 0.5% or more. Such a sintered body is produced by a method including using a powder that contains a stabilizer and zirconia with a monoclinic fraction of more than 70%, wherein monoclinic zirconia has a crystallite size of more than 23 nm and 80 nm or less.

19 Claims, No Drawings

(56) References Cited

OTHER PUBLICATIONS

Yoshinaka et al. "Characterization and sintering of yttria doped zirconia powders prepared by hydrazine method", British Ceramic Transations, Institute of Materials, London, GB, vol. 93, No. 6, Jan. 1, 1994, pp. 234-238, XP000484278, ISSN: 0967-9782.

* cited by examiner

SINTERED BODY, POWDER AND METHOD FOR PRODUCING THE SAME

TECHNICAL FIELD

The present disclosure relates to a sintered body containing zirconia as a main phase, a powder serving as a raw material for the sintered body and a method for producing the sintered body or powder.

BACKGROUND ART

Zirconia sintered bodies are being considered for decorative applications, such as decorative parts for watches, portable electronic devices, automobiles, home appliances and the like, in addition to conventional applications that require strength, such as grinding media and structural materials. Sintered bodies to be used for decorative applications are required to have reduced brittleness, that is, an increased fracture toughness value.

Various zirconia sintered bodies have been reported for the purpose of improving the fracture toughness value. For example, Patent Literature 1 reports a zirconia-alumina complex sintered body formed by mixing a commercial 3% by mole yttria-containing zirconia powder produced by a neutralization coprecipitation method with a commercial alumina powder to prepare a mixed powder and then performing microwave sintering of the mixed powder. The fracture toughness value ($K_{IC}$) of the complex sintered body measured by an IF method is said to be in the range of 6.02 to 6.90 MPa·m$^{1/2}$.

Patent Literature 2 reports a zirconia sintered body formed by hot isostatic pressing (HIP) of a zirconia powder containing phosphorus, silicon dioxide and alumina. The sintered body is reported to have a fracture toughness value in the range of 6 to 11 MPa·m$^{1/2}$ as measured by a method specified in JIS R 1607.

CITATION LIST

Patent Literature

PTL 1: Japanese Unexamined Patent Application Publication No. 2017-226555
PTL 2: Japanese Unexamined Patent Application Publication No. 2011-178610

SUMMARY OF INVENTION

Technical Problem

The zirconia sintered bodies disclosed in Patent Literature 1 and Patent Literature 2 need to be formed by a special sintering method, such as microwave sintering or HIP treatment, and are difficult to industrially apply. For application to decorative parts, it is also required to evaluate the brittleness of a sintered body with respect to a highly reliable fracture toughness value. However, there are a plurality of standardized methods for measuring fracture toughness, and these measurement methods give greatly different values. The fracture toughness values in Patent Literature 1 are measured by a simplified method, and the fracture toughness values in Patent Literature 2 are measured by an unclear method. Thus, these disclosed values are unreliable.

It is an object of the present disclosure to provide a raw material for a zirconia sintered body formed by pressureless sintering and having a high fracture toughness value measured by an SEPB method, a sintered body formed from the raw material, and a method for producing at least one of the raw material and the sintered body.

Solution to Problem

The aspects of the present disclosure are as follows:
[1] A sintered body comprising zirconia that contains a stabilizer and having a monoclinic fraction of 0.5% or more.
[2] The sintered body according to [1], wherein a ratio of an integrated intensity of an XRD peak corresponding to a (11-1) plane of monoclinic zirconia to an integrated intensity of an XRD peak corresponding to a (111) plane of the monoclinic zirconia is 0 or more.
[3] The sintered body according to [1] or [2], wherein the stabilizer is at least one selected from the group consisting of yttria, calcia, magnesia and ceria.
[4] The sintered body according to any one of [1] to [3], wherein the stabilizer content is 1.0% by mole or more and less than 2.5% by mole.
[5] The sintered body according to any one of [1] to [4], wherein a fracture toughness value measured by a method conforming to an SEPB method specified in JIS R 1607 is 6 MPa·m$^{0.5}$ or more and 11 MPa·m$^{0.5}$ or less.
[6] The sintered body according to any one of [1] to [5], further comprising: at least one additive component selected from the group consisting of alumina, germania and silica.
[7] The sintered body according to any one of [1] to [6], wherein the additive component is alumina.
[8] The sintered body according to any one of [1] to [7], wherein the zirconia contains monoclinic zirconia and at least one of tetragonal zirconia and cubic zirconia.
[9] The sintered body according to any one of [1] to [8], wherein a ratio of a tetragonal fraction after immersion treatment in hot water at 140° C. for 6 hours to a tetragonal fraction before the immersion treatment in hot water at 140° C. for 6 hours is 15% or more.
[10] A method for producing the sintered body according to any one of [1] to [9], comprising: using a powder that contains a stabilizer and zirconia with a monoclinic fraction of more than 70%, wherein monoclinic zirconia has a crystallite size of more than 23 nm and 80 nm or less.
[11] A powder comprising a stabilizer and zirconia with a monoclinic fraction of more than 70%, wherein monoclinic zirconia has a crystallite size of more than 23 nm and 80 nm or less.
[12] The powder according to [11], wherein the zirconia has a crystal phase containing monoclinic zirconia and tetragonal zirconia.
[13] The powder according to [11] or [12], wherein the stabilizer is at least one selected from the group consisting of yttria, calcia, magnesia and ceria.
[14] The powder according to any one of [11] to [13], wherein the stabilizer content is 1.0% by mole or more and less than 2.5% by mole.
[15] The powder according to any one of [11] to [14], further comprising: at least one additive component selected from the group consisting of alumina, germania and silica.
[16] The powder according to [15], wherein the additive component content is 0.1% or more by mass and 30% or less by mass.

[17] The powder according to any one of [11] to [16], wherein a BET specific surface area is 6 m²/g or more and less than 20 m²/g.

[18] The powder according to any one of [11] to [17], wherein a median size is 0.05 μm or more and 0.3 μm or less.

[19] A member comprising the sintered body according to any one of [1] to [9].

Advantageous Effects of Invention

The present disclosure can provide a raw material for a zirconia sintered body formed by pressureless sintering and having a high fracture toughness value measured by an SEPB method, a sintered body formed from the raw material, and a method for producing at least one of the raw material and the sintered body.

DESCRIPTION OF EMBODIMENTS

The present disclosure is described in the following embodiments.

The terms used in the present embodiments are described below.

The terms "monoclinic fraction" and "tetragonal fraction" refer to the proportions of monoclinic zirconia and tetragonal zirconia, respectively, in the crystal phase of zirconia. The term "monoclinic intensity ratio" refers to the ratio of the integrated intensity of an XRD peak corresponding to a (11-1) plane of monoclinic zirconia to the integrated intensity of an XRD peak corresponding to a (111) plane of the monoclinic zirconia in the crystal phase of zirconia.

For a powder, a powder X-ray diffraction (hereinafter also referred to as "XRD") pattern of the powder is used. For a sintered body, an XRD pattern of a surface of the sintered body after mirror polishing is used. The monoclinic fraction can be determined using the following formula (1). The tetragonal fraction can be determined using the following formula (2). The monoclinic intensity ratio can be determined using the following formula (3).

$$f_m = \{I_m(111) + I_m(11\text{-}1)\}/[I_m(111) + I_m(11\text{-}1) + I_t(111) + I_c(111)] \times 100 \quad (1)$$

$$f_t = I_t(111)/[I_m(111) + I_m(11\text{-}1) + I_t(111) + I_c(111)] \times 100 \quad (2)$$

$$M_{(11\text{-}1)/(111)} = \{I_m(11\text{-}1)/I_m(111)\} \quad (3)$$

In the formulae (1) to (3), $f_m$ denotes the monoclinic fraction (%), $f_t$ denotes the tetragonal fraction (%), $M_{(11\text{-}1)/(111)}$ denotes the monoclinic intensity ratio, $I_m(111)$ and $I_m(11\text{-}1)$ denote the integrated intensities of XRD peaks corresponding to the (111) and (11-1) planes of monoclinic zirconia, respectively, $I_t(111)$ denotes the integrated intensity of an XRD peak corresponding to the (111) plane of tetragonal zirconia, and $I_c(111)$ denotes the integrated intensity of an XRD peak corresponding to the (111) plane of cubic zirconia.

XRD patterns can be measured under the following conditions.

Radiation source: CuKα radiation (λ=0.15418 nm)
Measurement mode: continuous scanning
Scanning speed: 4 degrees/min
Step width: 0.02 degrees
Measurement range: 2θ=26 to 33 degrees In the XRD pattern measurement, an XRD peak corresponding to each crystal plane of zirconia is preferably measured as a peak with a peak top at the following 2θ.

XRD peak corresponding to (111) plane of monoclinic zirconia: 2θ=31±0.5 degrees
XRD peak corresponding to (11-1) plane of monoclinic zirconia: 2θ=28±0.5 degrees
XRD peaks corresponding to the (111) plane of tetragonal zirconia and cubic zirconia overlap, and the 2θ of each peak top is 2θ=30±0.5 degrees.

The integrated intensity of an XRD peak of each crystal plane can be determined after the XRD peaks are separated by a method described in H. Toraya, J. Appl. Crystallogr., 19, 440-447 (1986) using "PRO-FIT" as a calculation program.

A sintered body after surface polishing used for the XRD measurement is a sintered body with a surface roughness Ra of 0.04 μm or less formed by scraping the surface after sintering with a surface grinding machine and then by mirror-polishing a surface to be measured in the following order: automatic polishing with a coated abrasive, automatic polishing with diamond slurry with an average particle size of 3 μm, and automatic polishing with 0.03-μm colloidal silica.

The term "crystallite size of monoclinic zirconia" (hereinafter also referred to as "$D_m$") refers to a value determined from an XRD pattern of a powder using the following formula (4). The term "crystallite size of tetragonal zirconia" (hereinafter also referred to as "$D_t$") refers to a value determined from an XRD pattern of a powder using the following formula (5).

$$D_m = \kappa\lambda/(\beta \cos \theta_m) \quad (4)$$

$$D_t = \kappa\lambda/(\beta \cos \theta_t) \quad (5)$$

In the formulae (4) and (5), $D_m$ denotes the crystallite size (nm) of monoclinic zirconia, Dt denotes the crystallite size (nm) of tetragonal zirconia, K denotes the Scherer constant (κ=1), λ denotes the wavelength (nm) of a light source used for XRD measurement, β denotes the half-width (degrees) after correction of instrumental broadening using quartz sand (manufactured by Wako Pure Chemical Industries, Ltd.) with a particle size in the range of 25 to 90 μm, $\theta_m$ denotes the Bragg angle (degrees) of reflection corresponding to the (11-1) plane of monoclinic zirconia in XRD measurement, and $\theta_t$ denotes the Bragg angle (degrees) of reflection corresponding to the (111) plane of tetragonal zirconia in XRD measurement. When CuKα radiation is used as a light source for XRD measurement, λ is 0.15418 nm.

The term "BET specific surface area" refers to a value obtained by the BET one-point method using nitrogen ($N_2$) as an adsorption material in accordance with JIS R 1626-1996.

The term "particle size based on volume distribution" refers to the particle size of a powder determined in volumetric particle size distribution measurement by a laser diffraction method. The particle size determined by the laser diffraction method is a size determined by non-spherical approximation. The volumetric particle size distribution may be measured under the following conditions.

Sample: powder slurry
Refractive index of zirconia: 2.17
Refractive index of solvent (water): 1.333
Measurement time: 30 seconds
Pretreatment: ultrasonic dispersion treatment The term "median size" refers to a particle size corresponding to 50% by volume in a cumulative volumetric particle size distribution curve determined in the volumetric particle size distribution measurement by the laser diffraction method.

The term "particle size distribution curve" refers to a particle size distribution curve of a powder determined in the volumetric particle size distribution measurement by the laser diffraction method.

The term "fracture toughness value" refers to a fracture toughness value (MPa·m$^{0.5}$) measured by a method conforming to the SEPB method specified in JIS R 1607. The fracture toughness value may be measured at a span of 30 mm using a columnar sintered body sample 4 mm in width and 3 mm in thickness. The fracture toughness value of a sintered body of the present embodiment may be the average value of 10 measurements. JIS R 1607 specifies two methods for measuring fracture toughness: the IF method and the SEPB method. The IF method tends to give a larger measured value than the SEPB method. Furthermore, the IF method is a simplified measurement method and has large variations in measured values. Thus, absolute fracture toughness values in the present embodiment cannot be compared with absolute fracture toughness values measured by the IF method. Likewise, absolute fracture toughness values measured by methods other than the SEPB method cannot be compared with absolute fracture toughness values measured by the SEPB method.

The term "bending strength" refers to three-point bending strength determined in a three-point bending test according to JIS R 1601. The bending strength may be measured at a span of 30 mm using a columnar sintered body sample 4 mm in width and 3 mm in thickness. The bending strength of a sintered body of the present embodiment may be the average value of 10 measurements.

The term "total light transmittance" refers to the total light transmittance of light with a wavelength of 600 nm at a sample thickness of 1.0 mm and can be measured by a method according to JIS K 7361. It can be determined as a total transmittance of diffuse transmittance and linear transmittance of incident light with a wavelength of 600 nm. A sample with a thickness of 1 mm and a surface roughness (Ra) of 0.02 μm or less on both surfaces (the measurement surface and the opposite surface) may be used as a measurement sample. The sample may be irradiated with light with a wavelength of 600 nm using a general spectrophotometer (for example, V-650, manufactured by JASCO Corporation). Transmitted light may be focused with an integrating sphere to measure the transmittance (diffuse transmittance and linear transmittance) of light through the sample as the total light transmittance.

The term "linear transmittance" refers to the total light transmittance of light with a wavelength of 600 nm at a sample thickness in the range of 0.05 to 0.2 mm, preferably 0.05 to 0.15 mm, particularly 0.09 mm, and can be measured by a method according to JIS K 7361. It can be determined as the linear transmittance of incident light with a wavelength of 600 nm. A sample with a thickness of 1 mm and a surface roughness (Ra) of 0.02 μm or less on both surfaces (the measurement surface and the opposite surface) may be used as a measurement sample. The sample may be irradiated with light with a wavelength of 600 nm using a general spectrophotometer (for example, V-650, manufactured by JASCO Corporation). Transmitted light may be focused with an integrating sphere to measure the linear transmittance of light through the sample.

The term "relative density" refers to the ratio (%) of the measured density to the theoretical density. The measured density of a green body is the ratio (g/cm$^3$) of the mass determined by mass measurement to the volume determined by dimensional measurement. The measured density of a sintered body is the ratio (g/cm$^3$) of the mass determined by mass measurement to the volume determined by Archimedes' principle. The theoretical density is the density (g/cm$^3$) determined using the following formulae (6) to (9):

$$A = 0.5080 + 0.06980X/(100+X) \quad (6)$$

$$C = 0.5195 - 0.06180X/(100+X) \quad (7)$$

$$\rho_Z = [124.25(100-X) + 225.81X]/[150.5(100+X)A2C] \quad (8)$$

$$\rho_0 = 100/[(Y_A/3.987) + (Y_G/3.637) + (Y_S/2.2) + (100-Y_A-Y_G-Y_S)/\rho_Z] \quad (9)$$

In the formulae (6) to (9), $\rho_0$ denotes the theoretical density, $\rho_Z$ denotes the theoretical density of zirconia, A and C denote constants, X denotes the mole ratio (% by mole) of yttria to the total of zirconia ($ZrO_2$) and yttria ($Y_2O_3$), and $Y_A$, $Y_G$ and $Y_S$ denote the mass ratios (% by mass) of alumina in terms of $Al_2O_3$, germania in terms of $GeO_2$ and silica in terms of $SiO_2$ to the total of zirconia in terms of $ZrO_2$, yttria in terms of $Y_2O_3$, alumina in terms of $Al_2O_3$, germania in terms of $GeO_2$ and silica in terms of $SiO_2$, respectively, of a green body or a sintered body.

Sintered bodies according to the present embodiment are described below.

The present embodiment provides a sintered body comprising zirconia that contains a stabilizer and having a monoclinic fraction of 0.5% or more.

The sintered body according to the present embodiment is a sintered body comprising zirconia containing a stabilizer, and is a sintered body comprising zirconia containing a stabilizer as a main phase, that is, a so-called zirconia sintered body.

The stabilizer has a function of stabilizing zirconia, may be at least one selected from the group consisting of calcia (CaO), magnesia (MgO), ceria ($CeO_2$) and yttria ($Y_2O_3$), and is preferably at least one of ceria and yttria, more preferably yttria. In the sintered body according to the present embodiment, the stabilizer content is any content sufficient to partially stabilize zirconia. With respect to the stabilizer content, for example, when the stabilizer is yttria, the mole ratio of yttria ($Y_2O_3$) to the total of zirconia ($ZrO_2$) and yttria (={$Y_2O_3/(ZrO_2+Y_2O_3)$}×100 [% by mole], hereinafter also referred to as the "yttria content") in the sintered body may range from 1.0% to 2.5% by mole, 1.1% to 2.2% by mole or 1.1% to 2.0% by mole, preferably 1.2% by mole or more and less than 2.0% by mole, more preferably 1.2% to 1.8% by mole. A stabilizer content in such a range tends to result in a high fracture toughness value measured by the SEPB method. The yttria content preferably ranges from 1.4% to 2.1% by mole, more preferably 1.5% to 1.8% by mole.

The stabilizer is preferably dissolved in zirconia. The sintered body according to the present embodiment preferably contains no undissolved stabilizer, and the stabilizer is preferably entirely dissolved in zirconia. More preferably, an XRD pattern of the sintered body according to the present embodiment does not have an XRD peak of the stabilizer. In the present embodiment, an XRD peak of the stabilizer observed as an XRD peak different from the XRD peaks of zirconia can be considered to indicate an undissolved stabilizer.

The sintered body according to the present embodiment may contain at least one additive component selected from the group consisting of alumina ($Al_2O_3$), germania ($GeO_2$) and silica ($SiO_2$). The additive component is preferably at least one of alumina and germania, more preferably alumina. Even at a low stabilizer content of zirconia, the additive component tends to increase the grain boundary strength between crystal grains. When containing the additive component, the sintered body according to the present embodiment is a sintered body that contains the additive component and the remainder composed of zirconia containing a stabilizer. The additive component content is the mass ratio of the additive component to the total mass of zirconia, yttria and the additive component of the sintered body. For example, it is ($\{Al_2O_3/(ZrO_2+Y_2O_3+Al_2O_3)\} \times 100$ [% by mass]) for a sintered body containing alumina as an additive component and the remainder composed of zirconia containing yttria. The additive component content may be 0.05% or more by mass and 30% or less by mass, preferably more than 0.1% by mass and 25% or less by mass, more preferably 0.2% or more by mass and 20% or less by mass. An additive component content of 0.02% or more by mass and 0.3% or less by mass tends to result in high mechanical strength and less transformation to monoclinic zirconia.

The sintered body according to the present embodiment preferably contain no impurities other than incidental impurities. The incidental impurities may include hafnia ($HfO_2$).

The sintered body according to the present embodiment has a monoclinic fraction of 0.5% or more, preferably 0.5% to 15%, more preferably 0.8% to 12%. Because the fracture toughness tends to be high, the monoclinic fraction preferably ranges from 1% to 15%, 2% to 14%, 5% to 12% or 7% to 11%. Because the bending strength tends to be high, the monoclinic fraction preferably ranges from 0.5% to 5%, more preferably 0.8% to 3%.

An as-sintered-surface (hereinafter also referred to as a "sintered surface") of a sintered body immediately after sintering is rough and contains many fracture origins, such as irregularities. To prevent a sintered body from being broken, before evaluation or use in various applications, the sintered body is processed, for example, ground to remove the sintered surface and is then polished to expose a polished-surface (hereinafter also referred to as a "mirror surface"). The mirror surface may be a smooth surface and may be a surface with Ra of 0.04 μm or less. The monoclinic fraction is a value on the mirror surface of a sintered body. In a known sintered body containing a partially stabilized zirconia as a main phase, after processing or mirror finishing, such as polishing, the crystal phase is composed of at least one of tetragonal zirconia and cubic zirconia and contains substantially no monoclinic zirconia or a little monoclinic zirconia. Furthermore, a sintered body with poor mechanical characteristics may be broken during mirror finishing and even may not be processed into a sample for the measurement of the monoclinic fraction. In contrast, the sintered body according to the present embodiment contains monoclinic zirconia that satisfies the monoclinic fraction on the mirror surface thereof. Thus, the sintered body according to the present embodiment can be a sintered body containing monoclinic zirconia in the whole sintered body or a sintered body containing tetragonal zirconia that is easily transformed into monoclinic zirconia.

In the sintered body according to the present embodiment, the zirconia contains monoclinic zirconia and at least one of tetragonal zirconia and cubic zirconia and is preferably composed of monoclinic zirconia and tetragonal zirconia.

The monoclinic zirconia in the sintered body according to the present embodiment is monoclinic zirconia with an XRD peak corresponding to at least a monoclinic zirconia (111) plane in its XRD pattern. Such monoclinic zirconia contained in the state before degradation treatment tends to provide the sintered body with a high fracture toughness value and with resistance to hydrothermal degradation. When monoclinic zirconia is formed by degradation of the sintered body, an XRD peak corresponding mainly to the monoclinic zirconia (11–1) plane in an XRD pattern has high intensity. On the other hand, the monoclinic zirconia in the sintered body according to the present embodiment preferably has an XRD peak corresponding to at least the monoclinic zirconia (111) plane in its XRD pattern, and the monoclinic intensity ratio thereof is preferably 0 or more, more preferably 0.3 or more, still more preferably 0.4 or more, still more preferably 0.5 or more. The monoclinic intensity ratio is preferably 10 or less, 8 or less, 5 or less, 3 or less or 1.5 or less and may be 1.2 or less or 1.0 or less. The monoclinic intensity ratio can be determined using the formula (3). Thus, when $I_m(111)$ is zero, that is, in a sintered body without an XRD peak corresponding to the monoclinic zirconia (111) plane, the monoclinic intensity ratio is infinite and cannot be determined. In other words, the sintered body according to the present embodiment preferably does not include a sintered body with an infinite monoclinic intensity ratio.

The average grain size of the zirconia crystal grains in the sintered body according to the present embodiment varies with the sintering temperature and ranges from, for example, 0.1 to 0.8 μm, 0.15 to 0.60 μm, 0.20 to 0.55 μm or 0.25 to 0.45 μm.

The sintered body according to the present embodiment preferably has a relative density (hereinafter referred to as a "sintered body density") in the range of 98% to 100%, more preferably 98.4% to 100%, still more preferably 99% to 100%.

Furthermore, the sintered body according to the present embodiment is preferably a sintered body formed by pressureless sintering (a so-called pressureless sintered body), more preferably a sintered body formed by pressureless sintering in the air. Preferably, sintering treatment other than pressureless sintering is not performed. More preferably, sintering treatment after pressureless sintering is not performed. Sintering treatment other than pressureless sintering may be at least one selected from the group consisting of pressure sintering, vacuum sintering and microwave sintering.

The sintered body according to the present embodiment may have a fracture toughness value (a fracture toughness value measured by a method conforming to the SEPB method specified in JIS R 1607) of 6 MPa·m$^{0.5}$ or more and 11 MPa·m$^{0.5}$ or less, preferably 6.2 MPa·m$^{0.5}$ or more, more preferably 7 MPa·m$^{0.5}$ or more, still more preferably 8 MPa·m$^{0.5}$ or more. The fracture toughness value is preferably high but may be, for example, 11 MPa·m$^{0.5}$ or less, 10.5 MPa·m$^{0.5}$ or less, 9.5 MPa·m$^{0.5}$ or less, 9 MPa·m$^{0.5}$ or less or 8.5 MPa·m$^{0.5}$ or less. Having such a fracture toughness value, a sintered body with a thickness of, for example, 1 mm or less or 0.5 mm or less is easily processed. Thus, the sintered body according to the present embodiment is a sintered body in the thickness range of 0.05 to 0.3 mm or 0.08 to 0.25 mm, for example.

The sintered body according to the present embodiment may have a bending strength in the range of 1000 to 1550 MPa or 1100 to 1500 MPa, preferably 1100 to 1460 MPa, more preferably 1200 to 1400 MPa.

The sintered body according to the present embodiment preferably has a total light transmittance in the range of 20% to 50%, 25% to 45% or 30% to 40%. In particular, when the additive component constitutes more than 0% by mass and 25% or less by mass, 0.2% to 5% by mass or 0.23% to 3% by mass, the total light transmittance preferably ranges from 20% to 45% or 25% to 40%.

The sintered body according to the present embodiment may have a linear transmittance in the range of 1% to 20%, 1% to 15% or 1% to 10%. The linear transmittance is measured in a sintered body with a sample thickness in the range of 0.05 to 0.2 mm, preferably 0.05 to 0.15 mm, particularly 0.09 mm. The linear transmittance in the present embodiment is a measured value at such a sample thickness and is different from a value estimated or calculated from a linear transmittance measured in a sintered body with a larger sample thickness, such as a sintered body with a sample thickness of 0.5 mm or more.

The sintered body according to the present embodiment particularly preferably has a linear transmittance in the range of 1% to 10%, 1.5% to 8%, 2% to 7.5% or 2.5% to 7.3% at a sample thickness of 0.09 mm.

The tetragonal zirconia in the sintered body according to the present embodiment is preferably resistant to transformation into monoclinic zirconia by hydrothermal treatment (hereinafter also referred to as "hydrothermal degradation"). The ratio of the tetragonal fraction after immersion treatment in hot water at 140° C. for 6 hours to the tetragonal fraction before the immersion treatment in hot water at 140° C. for 6 hours (hereinafter also referred to as the "residual tetragonal fraction" or "ΔT %") is preferably 15% or more, more preferably 70% or more, still more preferably 80% or more. When tetragonal zirconia is not transformed into monoclinic zirconia by the immersion treatment in hot water at 140° C. for 6 hours, the residual tetragonal fraction is 100%. The sintered body according to the present embodiment may have a residual tetragonal fraction of 100% or less or 95% or less.

A higher additive component content tends to result in less hydrothermal degradation. In the sintered body according to the present embodiment, when the additive component content is 0% by mass, that is, without the additive component, the residual tetragonal fraction may range from 15% to 100%, preferably 20% to 100%, more preferably 50% to 80%. When the sintered body according to the present embodiment contains the additive component, and the additive component content is more than 0% by mass and less than 5% by mass, the residual tetragonal fraction may range from 65% to 100%, preferably 70% to 90%. When the sintered body according to the present embodiment contains the additive component, and the additive component content ranges from 5% to 30% by mass, the residual tetragonal fraction may range from 70% to 100%, preferably 76% to 95%.

The sintered body according to the present embodiment may have any desired shape and may be of a basic shape, such as cubic, rectangular parallelepiped, polyhedral, plate-like, discoidal, columnar, conical or pyramidal, spherical or approximately spherical, or of a shape of a member depending on each application.

The sintered body according to the present embodiment may be produced by any method and is preferably produced by a method comprising using as a raw material a powder that contains a stabilizer and zirconia with a monoclinic fraction of more than 70%, wherein monoclinic zirconia has a crystallite size of more than 23 nm and 80 nm or less. Such a powder may be formed and sintered by a known method. Furthermore, if necessary, at least one of calcination and processing may be performed before sintering.

The forming may be performed by a known method, for example, at least one selected from the group consisting of uniaxial pressing, cold isostatic pressing, slip casting and injection molding, preferably at least one selected from the group consisting of uniaxial pressing, cold isostatic pressing and injection molding.

In the calcination, the powder may be heat-treated at a temperature lower than the sintering temperature, for example, at a temperature of 800° C. or more and less than 1200° C. in the air.

The sintering may be performed by a known method, for example, at least one selected from the group consisting of pressure sintering, vacuum sintering and pressureless sintering. In terms of simplicity and industrial applicability, the sintering is preferably pressureless sintering, more preferably pressureless sintering at 1200° C. to 1550° C., preferably 1250° C. to 1500° C. in the air, still more preferably pressureless sintering at 1300° C. to 1450° C. in the air. Preferably, sintering other than pressureless sintering is not performed.

The sintered body according to the present embodiment can be used in an application of a known zirconia sintered body as a member containing the sintered body according to the present embodiment. The sintered body according to the present embodiment is suitable for structural materials, such as grinder members, precision machine components and optical connector components; biomaterials, such as dental materials; decorative members; and exterior materials, such as electronic equipment exterior components.

Powders according to the present embodiment are described below.

The present embodiment provides a powder comprising a stabilizer and zirconia with a monoclinic fraction of more than 70%, wherein monoclinic zirconia has a crystallite size of more than 23 nm and 80 nm or less.

The powder according to the present embodiment contains a stabilizer and zirconia with a monoclinic fraction of more than 70%. That is, the powder according to the present embodiment contains zirconia containing a stabilizer, the zirconia being composed mainly of monoclinic zirconia. It is difficult to produce a sintered body containing tetragonal zirconia by sintering a zirconia powder containing no stabilizer. The tetragonal zirconia provides fracture toughness. The powder according to the present embodiment is a so-called zirconia powder composed mainly of zirconia.

The stabilizer may be at least one selected from the group consisting of calcia (CaO), magnesia (MgO), ceria ($CeO_2$) and yttria ($Y_2O_3$) and is preferably at least one of ceria and yttria, more preferably yttria. When the stabilizer is yttria, the mole ratio of yttria to the total of zirconia ($ZrO_2$) and yttria ($Y_2O_3$) (yttria content) in the powder may range from 1.0% to 2.5% by mole or 1.1% to 2.0% by mole, preferably 1.2% by mole or more and less than 2.0% by mole, more preferably 1.2% to 1.8% by mole.

The stabilizer is preferably dissolved in zirconia, and the powder according to the present embodiment preferably contains no undissolved stabilizer.

Monoclinic zirconia, tetragonal zirconia and cubic zirconia are known as main crystal phases of zirconia. The zirconia in the powder according to the present embodiment contains monoclinic zirconia, preferably monoclinic zirconia and at least one of tetragonal zirconia and cubic zirconia, more preferably monoclinic zirconia and tetragonal zirconia.

The zirconia has a monoclinic fraction of more than 70%, preferably 80% or more, more preferably 85% or more. The monoclinic fraction is 100% or less. When the zirconia contains at least one of tetragonal zirconia and cubic zirconia, the monoclinic fraction is less than 100%. The tetragonal fraction is 30% or less or less than 20%, preferably 15% or less, and may be 10% or less or 7% or less. When the zirconia contains no tetragonal zirconia, the tetragonal fraction is 0%. The tetragonal fraction may be 0% or more.

The monoclinic zirconia has a crystallite size ($D_m$) of more than 23 nm and 80 nm or less, preferably 30 to 60 nm, more preferably 35 to 55 nm. In another embodiment, the monoclinic zirconia may have a crystal grain size ($D_m$) in the range of 30 to 50 nm, 35 to 50 nm, 35 to 45 nm, or 36 to 40 nm.

The powder according to the present embodiment may contain at least one additive component selected from the group consisting of alumina ($Al_2O_3$), germania ($GeO_2$) and silica ($SiO_2$). The additive component is preferably at least one of alumina and germania, more preferably alumina. Even at a low stabilizer content of the zirconia, the additive component reduces defects, such as a fracture, while sintering and reduces a decrease in yield while sintering. The additive component content, which is the mass ratio of the additive component to the total mass of zirconia, yttria and the additive component of the powder, may be 0.05% or more by mass and 30% or less by mass, preferably more than 0.1% by mass and 25% or less by mass, more preferably 0.2% or more by mass and 20% or less by mass, still more preferably 0.23% or more by mass and 6% or less by mass.

The powder according to the present embodiment is preferably free of impurities. For example, the phosphorus (P) content may be 0.1% or less by mass and less than 0.1% by mass. However, incidental impurities of zirconia, such as hafnia ($HfO_2$), may be contained.

The powder according to the present embodiment may have a BET specific surface area of 6 m$^2$/g or more and less than 20 m$^2$/g. At a BET specific surface area of 6 m$^2$/g or more, sintering can easily proceed at a relatively low temperature. At less than 20 m$^2$/g, physical aggregation of the powder tends to be reduced. To more easily produce these effects, the BET specific surface area is preferably 8 m$^2$/g or more and 18 m$^2$/g or less, more preferably 10 to 17 m$^2$/g, still more preferably 10 to 15 m$^2$/g, still more preferably more than 10 m$^2$/g and 15 m$^2$/g or less.

The powder according to the present embodiment preferably has a median size of 0.05 µm or more and 0.3 µm or less, preferably 0.1 µm or more and 0.2 µm or less.

The powder according to the present embodiment may have a multimodal volumetric particle size distribution curve, and the volumetric particle size distribution curve preferably has a peak at least at a particle size in the range of 0.05 to 0.2 µm and at a particle size of more than 0.2 µm and 0.5 µm or less, or a peak (extreme value) at a particle size in the range of 0.05 to 0.2 µm and at a particle size in the range of 0.3 to 0.5 µm. A powder with a multimodal volumetric particle size distribution curve, such as a bimodal distribution, tends to have good filling characteristics when formed. The resulting green body tends to have a high density, and the ratio of a peak with a particle size of 0.3 µm or more and 0.5 µm or less to a peak with a particle size in the range of 0.05 to 0.2 µm in the volumetric particle size distribution curve (hereinafter also referred to as the "particle size peak ratio") is preferably more than 0 and less than 1, more preferably 0.1 to 0.9, still more preferably 0.2 to 0.8.

The powder according to the present embodiment preferably has high formability. When the powder according to the present embodiment is subjected to uniaxial pressing at a pressure of 70±5 MPa and then to cold isostatic pressing (hereinafter also referred to as "CIP") at a pressure of 196±5 MPa to form a green body, the green body preferably has a relative density (hereinafter also referred to as a "green body density") in the range of 49% to 56%, more preferably 50% to 54%.

The powder according to the present embodiment may contain a resin or the like for improving flowability or may be a composition containing the powder according to the present embodiment and a resin (hereinafter also referred to as a "compound"). The resin in the compound may be any known resin used in ceramic compositions and is a thermoplastic resin, for example. A preferred resin may be at least one selected from the group consisting of acrylic resins, polystyrenes and polyalkyl carbonates, preferably an acrylic resin.

The powder content of the compound may range from 50% to 97% by mass, 70% to 95% by mass or 80% to 90% by mass, as the mass ratio of the powder to the compound. The powder content of the compound may be determined from the ratio of the mass of the compound after the resin is removed to the mass of the compound. The resin may be removed by any method, for example, by heat treatment in the temperature range of 200° C. to 500° C. in the air.

The compound may contain a component, such as wax, as an additive agent, in addition to the resin. These components produce additional effects, such as improved releasability from a forming die. The component, such as wax, may be at least one selected from the group consisting of polyethylene, polypropylene, polyacrylonitrile, acrylonitrile-styrene copolymers, ethylene-vinyl acetate copolymers, styrene-butadiene copolymers, polyacetal resins, petroleum waxes, synthetic waxes, plant waxes, stearic acid, phthalate plasticizers and adipates.

The powder according to the present embodiment can be used as a precursor for calcined bodies and sintered bodies and is suitable for raw powders of structural materials, such as grinder members, precision machine components and optical connector components; biomaterials, such as dental materials; decorative members; and exterior materials, such as electronic equipment exterior components.

To form a sintered body or the like from the powder according to the present embodiment, the powder may be formed and then calcined or sintered by a known method.

A green body of the powder according to the present embodiment is formed by a known method, for example, at least one selected from the group consisting of uniaxial pressing, cold isostatic pressing, slip casting and injection molding. When a green body is formed using a resin, for example, from a compound, the green body may be heat-treated to remove the resin, if necessary. The heat-treatment conditions may be 400° C. or more and less than 800° C. in the air.

The green body may be calcined, if necessary. The calcination may be heat treatment at a temperature lower than the sintering temperature of the powder, for example, at a temperature of 800° C. or more and less than 1200° C. in the air. Thus, a calcined body can be formed.

The sintering may be performed by a known method, for example, at least one selected from the group consisting of pressure sintering, vacuum sintering and pressureless sintering. In terms of simplicity and industrial applicability, the sintering is preferably pressureless sintering, more preferably pressureless sintering at 1200° C. to 1550° C., preferably 1250° C. to 1500° C. in the air, still more preferably pressureless sintering at 1300° C. to 1450° C. in the air. Preferably, sintering other than pressureless sintering is not performed. The sintering time may range from, but is not limited to, 0.5 to 5 hours.

Next, a method for producing the powder according to the present embodiment is described.

The powder according to the present embodiment with the above features can be produced by any method. A preferred method for producing the powder according to the present embodiment includes the step of heat-treating a composition containing a zirconia sol and a stabilizer source at 950° C. to 1250° C. to form a calcined powder, the zirconia sol having an average sol particle size in the range of 150 to 400 nm and containing zirconia containing monoclinic zirconia, and the step of grinding the calcined powder.

A calcined powder serving as a precursor of the powder according to the present embodiment is produced through the step of heat-treating a composition containing a zirconia sol and a stabilizer source at 950° C. to 1250° C. to form the calcined powder (hereinafter also referred to as a "powder calcination step"), the zirconia sol having an average sol particle size in the range of 150 to 400 nm and containing zirconia containing monoclinic zirconia.

The powder calcination step includes heat treatment at 950° C. to 1250° C. or 1000° C. to 1250° C. The heat treatment at 950° C. or more forms a powder that is easily densified by pressureless sintering. The heat treatment at 1250° C. or less can easily form a powder that is easily dispersed by grinding. The heat-treatment time depends on the heat-treatment temperature and may be 30 minutes or more and 2 hours or less.

The heat treatment may be performed in any atmosphere, for example, one selected from the group consisting of an oxidizing atmosphere, a reducing atmosphere, an inert atmosphere and a vacuum atmosphere, preferably an oxidizing atmosphere, more preferably the air atmosphere.

The zirconia sol has an average sol particle size in the range of 150 to 400 nm, preferably 180 to 400 nm, more preferably 185 to 300 nm. The average sol particle size may range from 150 to 270 nm, 150 to 200 nm, 190 to 400 nm or 200 to 300 nm.

The zirconia sol contains zirconia containing monoclinic zirconia and is preferably a zirconia sol containing zirconia composed of crystalline zirconia (hereinafter also referred to as a "crystalline zirconia sol"), more preferably a zirconia sol containing crystalline zirconia containing monoclinic zirconia as a main phase.

The zirconia sol tends to be easily ground. Thus, the zirconium element content (hereinafter also referred to as the "adsorbed zirconium content") of the zirconia sol determined by the following formula preferably ranges from 0% to 1% by mass, more preferably 0% to 0.5% by mass, still more preferably 0% to 0.01% by mass.

$$W_{Zr} = (m/m_0) \times 100$$

In this formula, $W_{Zr}$ denotes the adsorbed zirconium content (% by mass). m denotes the mass (mg) of zirconium in terms of zirconia ($ZrO_2$) in a filtrate obtained by ultrafiltration of a slurry containing the zirconia sol dispersed in pure water using an ultrafiltration membrane with a molecular weight cut-off in the range of 500 to 3,000,000. The zirconium content of the filtrate may be measured by ICP analysis. $m_o$ denotes the mass (mg) of the zirconia sol heat-treated at 1000° C. for 1 hour in the air before ultrafiltration. m and $m_o$ may be measured after the same amount of zirconia sol before ultrafiltration is prepared.

The zirconia sol for the powder calcination step only needs to have the above features and may be produced by any method. The zirconia sol may be produced by at least one of a hydrothermal synthesis method and a hydrolysis method. In the hydrothermal synthesis method, a coprecipitate prepared by mixing a zirconium salt, an alkali and the like in the presence of a solvent is heat-treated at 100° C. to 200° C. to prepare the zirconia sol. In the hydrolysis method, a zirconium salt is heated in the presence of a solvent to hydrolyze the zirconium salt and prepare the zirconia sol. Thus, the zirconia sol may be a zirconia sol prepared by the hydrothermal synthesis method or the hydrolysis method, preferably the hydrolysis method.

A precursor used in a method for producing a zirconia sol may be a zirconium salt. The zirconium salt may be at least one selected from the group consisting of zirconium oxychloride, zirconyl nitrate, zirconium chloride and zirconium sulfate, preferably at least one of zirconyl nitrate and zirconium oxychloride, more preferably zirconium oxychloride.

A hydrolysis method is described below as a preferred method for producing a zirconia sol.

The hydrolysis conditions may be any conditions under which hydrolysis of a zirconium salt proceeds sufficiently. For example, an aqueous zirconium salt is boiled under reflux for 130 to 200 hours. The average sol particle size tends to increase when an aqueous zirconium salt is hydrolyzed in the anion concentration range of 0.2 to 0.6 mol/L or 0.3 to 0.6 mol/L.

The stabilizer source may be at least one of a stabilizer and a compound serving as a precursor thereof, for example, at least one selected from the group consisting of oxides, hydroxides, oxyhydroxides, chlorides, acetates, nitrates and sulfates serving as a precursor of the stabilizer, preferably at least one of chlorides and nitrates. The stabilizer source is preferably at least one of yttria and an yttrium compound serving as a precursor thereof. A preferred stabilizer source (a stabilizer containing yttria or the like is hereinafter also referred to as an "yttria source" or the like) may be at least one selected from the group consisting of yttrium chloride, yttrium nitrate and yttrium oxide or at least one of yttrium chloride and yttrium oxide. When the stabilizer source is an yttria source, the yttria source content of the composition may range from 1.0% to 2.5% by mole or 1.1% to 2.0% by mole, preferably 1.2% by mole or more and less than 2.0% by mole, more preferably 1.2% to 1.8% by mole, as the mole ratio of the yttria source in terms of $Y_2O_3$ to the total of zirconium (Zr) and yttrium (Y) in terms of $ZrO_2$ and $Y_2O_3$ in the composition.

The composition for the powder calcination step only needs to contain the zirconia sol and a stabilizer source, and all or part of the stabilizer source may be dissolved in the zirconia sol.

For example, at least part of a stabilizer source can be easily dissolved in zirconia, for example, by hydrolysis of a mixture of a zirconium salt and the stabilizer source or by mixing a zirconium salt, the stabilizer source and an alkali to form a coprecipitate.

The composition for the powder calcination step may contain at least one additive component source selected from the group consisting of alumina sources, germania sources and silica sources. The additive component source is preferably at least one of an alumina source and a germania source, preferably an alumina source.

The alumina source is at least one of alumina and an aluminum compound serving as a precursor thereof, for example, at least one selected from the group consisting of alumina, aluminum hydroxide, aluminum nitrate and aluminum chloride, preferably alumina, more preferably at least one of an alumina sol and an alumina powder.

The germania source is at least one of germania and a germanium compound serving as a precursor thereof, for example, at least one selected from the group consisting of germania, germanium hydroxide and germanium chloride, preferably germania, more preferably at least one of a germania sol and a germania powder.

The silica source is at least one of silica and a silicon compound serving as a precursor thereof, for example, at least one selected from the group consisting of silica and tetraethyl orthosilicate, preferably silica, more preferably at least one of a silica powder, a silica sol, fumed silica and precipitated silica.

The additive component source content may range from 0.05% to 30% by mass, preferably more than 0.1% by mass and 25% or less by mass, more preferably 0.2% to 20% by mass, as the ratio of the total mass of Al, Ge and Si in terms of $Al_2O_3$, $GeO_2$ and $SiO_2$ to the total mass of Zr, Y, Al, Ge and Si in terms of $ZrO_2$, $Y_2O_3$, $Al_2O_3$, $GeO_2$ and $SiO_2$ in the composition.

For example, the alumina source content may range from 0.05% to 30% by mass, preferably more than 0.1% by mass and 25% or less by mass, more preferably 0.2% to 20% by mass, as the ratio of the mass of the alumina source in terms of $Al_2O_3$ to the total mass of Zr, Y and Al in terms of $ZrO_2$, $Y_2O_3$ and $Al_2O_3$ in the composition.

The germania source content may range from 0.05% to 30% by mass, preferably more than 0.1% by mass and 25% or less by mass, more preferably 0.2% to 20% by mass, as the ratio of the mass of the germania source in terms of $GeO_2$ to the total mass of Zr, Y and Ge in terms of $ZrO_2$, $Y_2O_3$ and $GeO_2$ in the composition.

The silica source content may range from 0.05% to 30% by mass, preferably more than 0.1% by mass and 25% or less by mass, more preferably 0.2% to 20% by mass, as the ratio of the mass of the silica source in terms of $SiO_2$ to the total mass of Zr, Y and Si in terms of $ZrO_2$, $Y_2O_3$ and $SiO_2$ in the composition.

Examples of physical properties of a calcined powder include a BET specific surface area in the range of 3 to 15 $m^2/g$ and a monoclinic crystallite size in the range of 20 to 60 nm.

In the step of grinding a calcined powder (hereinafter also referred to as a "grinding step"), the calcined powder is ground. Zirconia with a low stabilizer content tends to have a fracture or chipping while sintering. However, grinding a calcined powder in the present embodiment tends to increase the yield of sintering, and the resulting sintered body tends to be resistant to hydrothermal degradation.

To produce a powder with a desired composition, in the grinding step, a mixed powder of a calcined powder, an alumina source and an additive component source may be ground instead of the calcined powder. The additive component source may be the additive component source described above. When an additive component source is mixed in the grinding step, the additive component source and a calcined powder may be mixed such that the additive component content source is such that the sum of the mass ratio of Al in terms of $Al_2O_3$, the mass ratio of Ge in terms of $GeO_2$ and the mass ratio of Si in terms of $SiO_2$ relative to the total mass of Zr, Y and at least one selected from the group consisting of Al, Ge and Si in terms of $ZrO_2$, $Y_2O_3$, $Al_2O_3$, $GeO_2$ and $SiO_2$ in the mixed powder ranges from 0.05% to 30% by mass, preferably more than 0.1% by mass and 25% or less by mass, more preferably 0.2% to 20% by mass.

Any grinding method may be chosen, at least one of wet grinding and dry grinding may be chosen, and wet grinding is preferred. Specific wet grinding may be at least one selected from the group consisting of a ball mill, a vibrating mill and a continuous medium stirring mill and is preferably a ball mill. Under grinding conditions for a ball mill, for example, a calcined powder is mixed with a solvent to prepare a slurry in which the mass ratio of the calcined powder to the slurry ranges from 30% to 60% by mass, and the slurry is ground for 10 to 100 hours using zirconia balls with a size in the range of 1 to 15 mm as a grinding medium.

Wet grinding may be followed by drying by any method to produce a powder. The drying conditions may be 110° C. to 130° C. in the air.

To improve the operability of the powder, a method for producing the powder according to the present embodiment may include the step of granulating the powder (hereinafter also referred to as a "granulation step"). Granulation may be performed by any method. For example, a slurry of a mixture of the powder and a solvent is granulated by spraying. The solvent is at least one of water and an alcohol, preferably water. The granulated powder (hereinafter also referred to as "powder granules") has an average granule size in the range of 30 to 80 μm or 50 to 60 μm and a bulk density in the range of 1.00 to 1.40 $g/cm^3$ or 1.10 to 1.30 $g/cm^3$.

EXAMPLES

The present disclosure is described in the following examples. However, the present disclosure is not limited to these examples.

(Average Sol Particle Size)

The average sol particle size of a zirconia sol was measured with a dynamic light scattering particle size distribution measuring apparatus (apparatus name: UPA-UT151, manufactured by MicrotracBEL Corp.). For pretreatment of a sample, a solution containing hydrated zirconia sol was suspended in pure water and was dispersed for 3 minutes with an ultrasonic homogenizer.

(Monoclinic Fraction, Tetragonal Fraction, $D_t$ and $D_m$ of Powder)

An XRD pattern of a powder sample was measured with a general X-ray diffractometer (trade name: Ultima IV, manufactured by Rigaku Corporation). The conditions for XRD measurement are as follows:

Radiation source: CuKα radiation (λ=0.15418 nm)
Measurement mode: continuous scanning
Scanning speed: 4 degrees/min
Step width: 0.02 degrees
Measurement range: 2θ=26 to 33 degrees Using the measured XRD pattern and a calculation program "PRO-FIT", the monoclinic fraction, tetragonal fraction, $D_t$ and $D_m$ were determined using the formulae (1), (2), (4) and (5), respectively.

(BET Specific Surface Area)

The BET specific surface area of a powder sample was measured with a general flow-type automatic specific surface area measuring apparatus (apparatus name: FlowSorb III 2305, manufactured by Shimadzu Corporation) using nitrogen as an adsorption gas by a method according to JIS R 1626-1996. Before the measurement, a powder sample was degassed at 250° C. for 30 minutes in the air as pretreatment.

(Particle Size Distribution Measurement)

The median size was determined by measuring a volumetric particle size distribution curve of a powder sample with a Microtrac particle size distribution analyzer (trade name: MT3000II, manufactured by MicrotracBEL Corp.) in an HRA mode. Before the measurement, a powder sample was suspended in pure water and was dispersed for 10 minutes with an ultrasonic homogenizer as pretreatment.

(Green Body Density)

The mass of a green body sample was measured with a balance, and the volume was determined from dimensions measured with a vernier caliper. The measured density was determined from the mass and the volume. The theoretical density was determined using the formulae (5) to (8), and the relative density (%) was determined from the measured density (ρ) relative to the theoretical density ($ρ_0$) as a green body density.

(Monoclinic Fraction and Monoclinic Intensity Ratio of Sintered Body)

An XRD of a sintered body sample was measured under the XRD measurement conditions of the powder sample. Using the measured XRD pattern and the calculation program "PRO-FIT", the monoclinic fraction and the monoclinic intensity ratio were determined using the formulae (1) and (3), respectively.

For XRD measurement, a sintered body sample with a surface roughness (Ra) of 0.04 μm or less was used after the surface of the sintered body sample was scraped with a surface grinding machine and was then mirror-polished in the following order: automatic polishing with waterproof abrasive paper (#800), automatic polishing with diamond slurry with an average particle size of 3 μm, and automatic polishing with 0.03-μm colloidal silica. For the automatic polishing, an automatic polishing apparatus (apparatus name: MECATECH 334, manufactured by PRESI) was used.

(Sintered Body Density)

The measured density of a sintered body sample was determined by Archimedes' principle. Before the measurement, the mass of a sintered body after drying was measured, and then the sintered body was placed in water and was boiled for 1 hour as pretreatment. The theoretical density was determined using the formulae (5) to (8), and the relative density (%) was determined from the measured density (ρ) relative to the theoretical density ($ρ_0$) as a sintered body density.

(Average Grain Size)

The average grain size was determined by a planimetric method using a SEM view of a sintered body sample obtained by field-emission scanning electron microscope observation. More specifically, a circle with a known area was drawn on the SEM view, and the number of crystal grains (Nc) in the circle and the number of crystal grains (Ni) on the circumference of the circle were counted.

When the total number of crystal grains (Nc+Ni) was 250±50, the average grain size was determined using the following formula.

$$\text{Average grain size} = (Nc + (1/2) \times Ni)/(A/M^2)$$

In this formula, Nc denotes the number of crystal grains in the circle, Ni denotes the number of crystal grains on the circumference of the circle, A denotes the area of the circle, and M denotes the magnification (5000 times) of the scanning electron microscope observation. When the number of crystal grains (Nc+Ni) in a SEM view is less than 200, a plurality of SEM views were used to satisfy (Nc+Ni) of 250±50.

Before the measurement, a sintered body sample was mirror-polished and then thermally etched as pretreatment. In the mirror polishing, the surface of the sintered body was scraped with a surface grinding machine and was then polished with a mirror polishing apparatus using diamond abrasive grains with an average grain size of 9 μm, 6 μm and 1 μm in this order.

(Fracture Toughness Value)

The fracture toughness value of a sintered body sample was measured by a method conforming to the SEPB method specified in JIS R 1607. Measurement was performed at a span of 30 mm using a columnar sintered body sample 4 mm in width and 3 mm in thickness, and 10 measurements were averaged as a fracture toughness value.

(Bending Strength)

The bending strength of a sintered body sample was measured in a three-point bending test according to JIS R 1601. Measurement was performed at a span of 30 mm using a columnar sintered body sample 4 mm in width and 3 mm in thickness, and 10 measurements were averaged as bending strength.

(Total Light Transmittance)

Total light transmittance was measured with a spectrophotometer (apparatus name: V-650, manufactured by JASCO Corporation) by a method according to JIS K 7361. A disk-shaped sample was used for the measurement. Before the measurement, both surfaces of the sample were polished to a sample thickness of 1 mm and a surface roughness (Ra) of 0.02 μm or less. Light in the wavelength range of 220 to 850 nm was passed through the sample and was focused with an integrating sphere to measure transmittance at each wavelength. Transmittance at a wavelength of 600 nm was taken as total light transmittance.

Example 1

An aqueous zirconium oxychloride with a zirconium concentration and a chloride ion concentration of 0.4 mol/L was hydrolyzed. The aqueous solution after the hydrolysis was ultrafiltered through an ultrafiltration membrane (molecular weight cut-off: 6000) to prepare a zirconia sol with an average sol particle size of 250 nm. The $W_{Zr}$ of the zirconia sol was below the detection limit (0.01% or less by mass).

Yttrium chloride hexahydrate and aqueous ammonia were added to the aqueous zirconia sol after the ultrafiltration at an yttria content of 1.6% by mole to form a precipitate. The precipitate was washed with pure water, was dried in the air, and was then calcined in the air at a calcination temperature of 1025° C. for 2 hours to prepare a calcined powder. The calcined powder had a BET specific surface area of 12.5 m$^2$/g and a monoclinic crystallite size of 35 nm.

The calcined powder was mixed with pure water to prepare a slurry. The slurry was ball-milled with zirconia balls and was dried in the air at 120° C. to prepare a powder composed of yttria-containing zirconia with an yttria content of 1.6% by mole, which was used as a powder of the present example. The powder of the present example contained yttria entirely dissolved in zirconia and had crystal phases of monoclinic zirconia and tetragonal zirconia. Furthermore, the median size was 0.15 μm, the volumetric particle size distribution curve had bimodal distribution with peaks at a particle size of 0.14 μm and a particle size of 0.33 μm, and the particle size peak ratio was 0.39.

The powder of the present example was subjected to die pressing at a pressure of 70 MPa and CIP treatment at a pressure of 196 MPa to form a green body. The green body was subjected to pressureless sintering in the air at a sintering temperature of 1300° C. for 2 hours to prepare a sintered body.

Example 2

A powder containing 0.25% by mass of alumina in terms of $Al_2O_3$ and the remainder composed of 1.6% by mole yttria-containing zirconia was prepared in the same manner as in Example 1 except that a mixed powder of a calcined powder and 0.25% by mass of an alumina sol in terms of $Al_2O_3$ was ball milled. The powder of the present example had a median size of 0.15 μm, had a volumetric particle size distribution curve with bimodal distribution with peaks at a particle size of 0.14 μm and a particle size of 0.32 μm, and had a particle size peak ratio of 0.37.

A green body and a sintered body were formed in the same manner as in Example 1 except that the powder of the present example was used and the sintering temperature was 1250° C.

Example 3

A powder containing 0.25% by mass of alumina in terms of $Al_2O_3$ and the remainder composed of 1.6% by mole yttria-containing zirconia was prepared in the same manner as in Example 1 except that the calcination temperature was 1130° C. and a mixed powder of a calcined powder and 0.25% by mass of an alumina sol in terms of $Al_2O_3$ was ball milled.

A calcined powder thus formed had a BET specific surface area of 6.7 $m^2/g$ and a monoclinic crystallite size of 44 nm. The powder of the present example had a median size of 0.18 μm, had a volumetric particle size distribution curve with bimodal distribution with peaks at a particle size of 0.14 μm and a particle size of 0.36 μm, and had a particle size peak ratio of 0.85.

A green body and a sintered body were formed in the same manner as in Example 1 except that the powder of the present example was used.

Example 4

A powder containing 0.25% by mass of alumina in terms of $Al_2O_3$ and the remainder composed of 2% by mole yttria-containing zirconia was prepared in the same manner as in Example 1 except that yttrium chloride hexahydrate was added to the aqueous zirconia sol after ultrafiltration such that yttria constituted 2% by mole and a mixed powder of a calcined powder and 0.25% by mass of an alumina sol in terms of $Al_2O_3$ was ball milled. The powder of the present example had a median size of 0.15 μm, had a volumetric particle size distribution curve with bimodal distribution with peaks at a particle size of 0.14 μm and a particle size of 0.33 μm, and had a particle size peak ratio of 0.33.

A green body and a sintered body were formed in the same manner as in Example 1 except that the powder of the present example was used and the sintering temperature was 1500° C.

Example 5

A powder containing 20% by mass of alumina in terms of $Al_2O_3$ and the remainder composed of 1.6% by mole yttria-containing zirconia was prepared in the same manner as in Example 1 except that a mixed powder of a calcined powder and 20% by mass of an alumina powder in terms of $Al_2O_3$ was ball milled. The powder of the present example had a median size of 0.15 μm, had a volumetric particle size distribution curve with bimodal distribution with peaks at a particle size of 0.14 μm and a particle size of 0.35 μm, and had a particle size peak ratio of 0.41. The tetragonal zirconia had a crystallite size ($D_t$) of 42 nm.

A green body and a sintered body were formed in the same manner as in Example 1 except that the powder of the present example was used and the sintering temperature was 1350° C.

Example 6

A powder containing 20% by mass of alumina in terms of $Al_2O_3$ and the remainder composed of 1.6% by mole yttria-containing zirconia was prepared in the same manner as in Example 1 except that the calcination temperature was 1130° C. and a mixed powder of a calcined powder and 20% by mass of an alumina powder in terms of $Al_2O_3$ was ball milled. The powder of the present example had a median size of 0.16 μm, had a volumetric particle size distribution curve with bimodal distribution with peaks at a particle size of 0.14 μm and a particle size of 0.35 μm, and had a particle size peak ratio of 0.67.

A green body and a sintered body were formed in the same manner as in Example 1 except that the powder of the present example was used and the sintering temperature was 1400° C.

Example 7

A powder containing 5% by mass of alumina in terms of $Al_2O_3$ and the remainder composed of 2% by mole yttria-containing zirconia was prepared in the same manner as in Example 1 except that yttrium chloride hexahydrate was added to the aqueous zirconia sol after ultrafiltration such that yttria constituted 2% by mole and a mixed powder of a calcined powder and 5% by mass of an alumina sol in terms of $Al_2O_3$ was ball milled. The powder of the present example had a median size of 0.15 μm, had a volumetric particle size distribution curve with bimodal distribution with peaks at a particle size of 0.14 μm and a particle size of 0.35 μm, and had a particle size peak ratio of 0.41.

A green body and a sintered body were formed in the same manner as in Example 1 except that the powder of the present example was used and the sintering temperature was 1500° C.

Example 8

A powder containing 0.5% by mass of alumina in terms of $Al_2O_3$ and the remainder composed of 1.6% by mole yttria-containing zirconia was prepared in the same manner as in Example 1 except that a mixed powder of a calcined powder and 0.5% by mass of an alumina sol in terms of $Al_2O_3$ was ball milled. The powder of the present example had a median size of 0.15 μm, had a volumetric particle size distribution curve with bimodal distribution with peaks at a particle size of 0.14 μm and a particle size of 0.32 μm, and had a particle size peak ratio of 0.49.

A green body and a sintered body were formed in the same manner as in Example 1 except that the powder of the present example was used and the sintering temperature was 1250° C.

Example 9

A powder containing 1% by mass of alumina in terms of $Al_2O_3$ and the remainder composed of 1.6% by mole yttria-containing zirconia was prepared in the same manner as in Example 1 except that a mixed powder of a calcined powder and 1% by mass of an alumina sol in terms of $Al_2O_3$ was ball milled. The powder of the present example had a median size of 0.15 μm, had a volumetric particle size distribution curve with bimodal distribution with peaks at a particle size of 0.14 μm and a particle size of 0.34 μm, and had a particle size peak ratio of 0.49.

A green body and a sintered body were formed in the same manner as in Example 1 except that the powder of the present example was used and the sintering temperature was 1250° C.

Example 10

A powder containing 0.25% by mass of germanium oxide in terms of $GeO_2$ and the remainder composed of 1.6% by mole yttria-containing zirconia was prepared in the same manner as in Example 1 except that a mixed powder of a calcined powder and 0.25% by mass of germanium oxide in terms of $GeO_2$ was ball milled. The powder of the present example had a median size of 0.14 μm, had a volumetric particle size distribution curve with bimodal distribution with peaks at a particle size of 0.14 μm and a particle size of 0.34 μm, and had a particle size peak ratio of 0.37.

A green body and a sintered body were formed in the same manner as in Example 1 except that the powder of the present example was used and the sintering temperature was 1250° C.

Example 11

A powder containing 0.25% by mass of silica in terms of $SiO_2$ and the remainder composed of 1.6% by mole yttria-containing zirconia was prepared in the same manner as in Example 1 except that a mixed powder of a calcined powder and 0.25% by mass of silica sol in terms of $SiO_2$ was ball milled. The powder of the present example had a median size of 0.18 μm, had a volumetric particle size distribution curve with bimodal distribution with peaks at a particle size of 0.14 μm and a particle size of 0.35 μm, and had a particle size peak ratio of 0.89.

A green body and a sintered body were formed in the same manner as in Example 1 except that the powder of the present example was used and the sintering temperature was 1350° C.

Example 12

A powder containing 0.25% by mass of alumina in terms of $Al_2O_3$, 0.25% by mass of germanium oxide in terms of $GeO_2$ and the remainder composed of 1.6% by mole yttria-containing zirconia was prepared in the same manner as in Example 1 except that a mixed powder of a calcined powder, 0.25% by mass of an alumina sol in terms of $Al_2O_3$ and 0.25% by mass of germanium oxide in terms of $GeO_2$ was ball milled. The powder of the present example had a median size of 0.15 μm, had a volumetric particle size distribution curve with bimodal distribution with peaks at a particle size of 0.14 μm and a particle size of 0.34 μm, and had a particle size peak ratio of 0.37.

A green body and a sintered body were formed in the same manner as in Example 1 except that the powder of the present example was used and the sintering temperature was 1200° C.

Comparative Example 1

An aqueous zirconium oxychloride with a zirconium concentration of 0.37 mol/L and a chloride ion concentration of 0.74 mol/L was hydrolyzed. The aqueous solution after the hydrolysis was ultrafiltered through an ultrafiltration membrane (molecular weight cut-off: 6000) to prepare a zirconia sol with an average sol particle size of 100 nm. The zirconia sol had a $W_{Zr}$ of 9% by mass.

Yttrium chloride hexahydrate and aqueous ammonia were added to the aqueous zirconia sol after the ultrafiltration at an yttria content of 2% by mole to form a precipitate. The precipitate was washed with pure water, was dried in the air, and was then calcined in the air at a calcination temperature of 1000° C. for 2 hours to prepare a calcined powder.

The calcined powder was mixed with pure water to prepare a slurry. The slurry was ball-milled with zirconia balls and was dried in the air at 120° C. to prepare a powder composed of yttria-containing zirconia with an yttria content of 2% by mole, which was used as a powder of the present comparative example.

The powder of the present comparative example was subjected to die pressing at a pressure of 70 MPa and CIP treatment at a pressure of 196 MPa to form a green body. The green body was subjected to pressureless sintering in the air at a sintering temperature of 1450° C. for 2 hours to prepare a sintered body.

Comparative Example 2

A powder containing 0.25% by mass of alumina in terms of $Al_2O_3$ and the remainder composed of 2% by mole yttria-containing zirconia was prepared in the same manner as in Comparative Example 1 except that a mixed powder of a calcined powder and 0.25% by mass of an alumina powder in terms of $Al_2O_3$ was ball milled.

A green body and a sintered body were formed in the same manner as in Comparative Example 1 except that the powder of the present comparative example was used.

Comparative Example 3

A powder containing 5% by mass of alumina in terms of $Al_2O_3$ and the remainder composed of 2% by mole yttria-containing zirconia was prepared in the same manner as in Comparative Example 1 except that a mixed powder of a calcined powder and 5% by mass of an alumina powder in terms of $Al_2O_3$ was ball milled.

A green body and a sintered body were formed in the same manner as in Comparative Example 1 except that the powder of the present comparative example was used.

Comparative Example 4

A powder of 0.5% by mole yttria-containing zirconia was prepared in the same manner as in Example 1 except that a precipitate was formed by adding yttrium chloride hexahydrate and aqueous ammonia to the aqueous zirconia sol after ultrafiltration such that yttria constituted 0.9% by mole.

The powder was subjected to die pressing at a pressure of 70 MPa and CIP treatment at a pressure of 196 MPa to form a green body. The green body was subjected to pressureless sintering in the air at a sintering temperature of 1300° C. for 2 hours to prepare a sintered body. The sintered body had a low density and a large number of cracks and therefore could not be evaluated for its characteristics.

Table 1 shows the evaluation results of the powders of the examples and comparative examples. Table 2 shows the evaluation results of the sintered bodies of the examples and comparative examples.

TABLE 1

|  | $Y_2O_3$ mol % | $Al_2O_3$ wt % | $GeO_2$ wt % | $SiO_2$ wt % | $D_m$ nm | Monoclinic fraction % | Tetragonal fraction % | BET specific surface area $m^2/g$ |
|---|---|---|---|---|---|---|---|---|
| Example 1 | 1.6 | 0 | 0 | 0 | 37 | 94 | 6 | 15.9 |
| Example 2 | 1.6 | 0.25 | 0 | 0 | 37 | 94 | 6 | 15.1 |
| Example 3 | 1.6 | 0.25 | 0 | 0 | 48 | 100 | 0 | 10.3 |
| Example 4 | 2.0 | 0.25 | 0 | 0 | 36 | 91 | 9 | 17.7 |
| Example 5 | 1.6 | 20 | 0 | 0 | 40 | 93 | 7 | 16.8 |
| Example 6 | 1.6 | 20 | 0 | 0 | 48 | 100 | 0 | 11.6 |
| Example 7 | 2.0 | 5 | 0 | 0 | 39 | 88 | 12 | 17.6 |
| Example 8 | 1.6 | 0.5 | 0 | 0 | 36 | 95 | 5 | 16.8 |
| Example 9 | 1.6 | 1 | 0 | 0 | 36 | 95 | 5 | 17.9 |
| Example 10 | 1.6 | 0 | 0.25 | 0 | 36 | 95 | 5 | 16.2 |
| Example 11 | 1.6 | 0 | 0 | 0.25 | 37 | 92 | 8 | 14.8 |
| Example 12 | 1.6 | 0.25 | 0.25 | 0 | 37 | 95 | 5 | 16.8 |
| Comparative example 1 | 2.0 | 0 | 0 | 0 | 16 | 64 | 36 | 17.0 |
| Comparative example 2 | 2.0 | 0.25 | 0 | 0 | 16 | 64 | 36 | 16.8 |
| Comparative example 3 | 2.0 | 5 | 0 | 0 | 16 | 65 | 35 | 16.5 |
| Comparative example 4 | 0.9 | 0 | 0 | 0 | 23 | 100 | 0 | 15.8 |

The table shows that the powders of the examples and Comparative Examples 1 to 3 had almost the same stabilizer contents (yttria contents) and additive agent contents, but Comparative Examples 1 to 3 had a smaller $D_m$ and a lower monoclinic fraction than the examples. Furthermore, Comparative Example 4 had a smaller $D_m$ than the examples.

TABLE 2

|  | Green body Density % | Sintered body | | | | | |
|---|---|---|---|---|---|---|---|
|  |  | Density % | Average grain size μm | Monoclinic fraction % | Monoclinic intensity ratio | Fracture toughness value MPa·m$^{0.5}$ | Bending strength MPa |
| Example 1 | 50.4 | 99.1 | 0.25 | 7.1 | 0.57 | 7.4 | 1160 |
| Example 2 | 50.5 | 99.6 | 0.17 | 5.9 | 0.68 | 8.4 | 1260 |
| Example 3 | 52.5 | 99.7 | 0.22 | 7.1 | 0.44 | 8.1 | 1270 |
| Example 4 | 50.3 | 99.7 | 0.57 | 1.3 | 0.00 | 7.0 | 1300 |
| Example 5 | 52.7 | 98.5 | 0.22 | 6.8 | 0.40 | 6.6 | 1110 |
| Example 6 | 53.9 | 99.4 | 0.28 | 7.4 | 0.47 | 6.6 | 1150 |
| Example 7 | 50.9 | 99.8 | 0.49 | 0.9 | 0.00 | 6.5 | 1450 |
| Example 8 | 50.0 | 99.9 | 0.22 | 2.9 | 0.08 | 8.1 | 1220 |
| Example 9 | 50.5 | 99.8 | 0.21 | 7.1 | 0.46 | 8.2 | 1170 |
| Example 10 | 50.1 | 99.8 | 0.25 | 3.0 | 0.08 | 6.5 | 1090 |
| Example 11 | 50.0 | 99.5 | 0.34 | 5.8 | 0.63 | 7.9 | 1130 |
| Example 12 | 49.8 | 99.6 | 0.19 | 6.8 | 0.42 | 7.5 | 1200 |
| Comparative example 1 | 47.6 | 99.6 | 0.53 | 0 | — | 5.5 | 1200 |
| Comparative example 2 | 47.8 | 99.7 | 0.54 | 0.4 | 0 | 5.7 | 1270 |
| Comparative example 3 | 47.2 | 99.7 | 0.52 | 0 | 0 | 5.7 | 1260 |
| Comparative example 4 | 48.7 | 88.4 | | Unmeasurable | | | |

The table shows that the examples had a green body density of 49% or more or 50% or more, and the comparative examples had a green body density of less than 49% or less than 48%. Thus, the powders of the present examples had good filling characteristics. On the other hand, although the sintered body densities of the sintered bodies with a stabilizer content of 1.0% by mole or more were almost the same in the examples and the comparative examples, the examples had a fracture toughness value of 6.5 MPa·m$^{0.5}$ or more, whereas the comparative examples had a fracture toughness value of less than 6 MPa·m$^{0.5}$. Thus, sintered bodies with high fracture toughness can be formed from the powders of the present example by pressureless sintering. The sintered body of Comparative Example 1 did not have an XRD peak corresponding to the (111) plane of monoclinic zirconia, and the monoclinic intensity ratio could not be calculated. Furthermore, the sintered body of Comparative Example 4 had a large number of defects, such as cracks, collapsed while processing, such as mirror polishing, to a sample, and therefore could not be used for measurement other than the sintered body density.

The fracture toughness of the sintered bodies of Examples 1 and 5 was measured by a method conforming to the IF method specified in JIS R 1607. The fracture toughness measured by the IF method was 17.9 MPa·m$^{0.5}$ and 11.1 MPa·m$^{0.5}$, respectively. Although the IF method and the SEPB method had a different degree of increase in measured fracture toughness, the fracture toughness measured by the IF method was higher than the fracture toughness measured by the SEPB method.

Example 13

A powder was prepared in the same manner as in Example 1. A sintered body was prepared in the same manner as in Example 1 except that the powder thus prepared was used and the sintering temperature was 1400° C.

Example 14

A powder was prepared in the same manner as in Example 2. A sintered body was prepared in the same manner as in Example 2 except that the powder thus prepared was used and the sintering temperature was 1350° C.

Example 15

A powder was prepared in the same manner as in Example 3. A sintered body was prepared in the same manner as in Example 3 except that the powder thus prepared was used and the sintering temperature was 1400° C.

Example 16

A powder was prepared in the same manner as in Example 5. A sintered body was prepared in the same manner as in Example 5 except that the powder thus prepared was used and the sintering temperature was 1500° C.

Example 17

A powder was prepared in the same manner as in Example 6. A sintered body was prepared in the same manner as in Example 6 except that the powder thus prepared was used and the sintering temperature was 1500° C.

Example 18

A powder was prepared in the same manner as in Example 8. A sintered body was prepared in the same manner as in Example 8 except that the powder thus prepared was used and the sintering temperature was 1350° C.

Example 19

A powder was prepared in the same manner as in Example 9. A sintered body was prepared in the same manner as in Example 9 except that the powder thus prepared was used and the sintering temperature was 1350° C.

Example 20

A powder was prepared in the same manner as in Example 10. A sintered body was prepared in the same manner as in Example 10 except that the powder thus prepared was used and the sintering temperature was 1350° C.

Example 21

A powder was prepared in the same manner as in Example 12. A sintered body was prepared in the same manner as in Example 12 except that the powder thus prepared was used and the sintering temperature was 1250° C.

Example 22

A powder was prepared in the same manner as in Example 12. A sintered body was prepared in the same manner as in Example 12 except that the powder thus prepared was used and the sintering temperature was 1350° C.

Comparative Example 5

A powder was prepared in the same manner as in Comparative Example 1. A sintered body was prepared in the same manner as in Comparative Example 1 except that the powder thus prepared was used and the sintering temperature was 1500° C.

TABLE 3

|  | Sintered body | | | | |
| --- | --- | --- | --- | --- | --- |
|  | Density % | Average grain size μm | Monoclinic fraction % | Monoclinic intensity ratio | Fracture toughness value MPa·m$^{0.5}$ | Bending strength MPa |
| Example 13 | 99.6 | 0.37 | 10.1 | 1.10 | 9.2 | 1210 |
| Example 14 | 99.7 | 0.28 | 8.5 | 0.78 | 10.1 | 1270 |
| Example 15 | 99.7 | 0.34 | 7.2 | 0.50 | 9.5 | 1270 |
| Example 16 | 99.9 | 0.51 | 9.1 | 0.93 | 8.2 | 1280 |
| Example 17 | 99.9 | 0.51 | 7.1 | 0.41 | 7.6 | 1240 |
| Example 18 | 99.7 | 0.30 | 6.0 | 0.54 | 10.5 | 1050 |
| Example 19 | 99.5 | 0.28 | 8.3 | 0.77 | 9.9 | 1260 |
| Example 20 | 99.9 | 0.34 | 6.3 | 0.48 | 7.2 | 1020 |
| Example 21 | 99.9 | 0.26 | 5.9 | 0.33 | 7.5 | 1200 |
| Example 22 | 99.9 | 0.33 | 5.7 | 0.41 | 8.3 | 1120 |
| Comparative example 5 | 99.6 | 0.58 | 0 | — | 5.7 | 1210 |

The sintered bodies of the examples had a fracture toughness value of 7 MPa·m$^{0.5}$ or more as measured by the SEPB method.

Measurement Example 1 (Hydrothermal Degradation Test)

A sintered body was prepared in the same manner as in Example 2, was mirror-polished, and was then immersed in hot water at 140° C. to perform a hydrothermal degradation test. The monoclinic fraction of the surface of the sintered body was determined after 6 hours and 10 hours of the immersion. In a comparative measurement example, a 3% by mole yttria-containing zirconia sintered body was treated and evaluated in the same manner. The results are shown in the following table.

The sintered body of the comparative measurement example was formed by preparing a powder of 3% by mole yttria-containing zirconia in the same manner as Comparative Example 1 except that yttrium chloride hexahydrate was added to the aqueous zirconia sol after ultrafiltration such that yttria constituted 3% by mole, subjecting the powder to die pressing at a pressure of 70 MPa and CIP treatment at a pressure of 196 MPa to form a green body, and subjecting the green body to pressureless sintering in the air at a sintering temperature of 1500° C. for 2 hours. The sintered body of the comparative measurement example had a fracture toughness value of 4.8 MPa·m$^{0.5}$.

was tetragonal zirconia. The phase transition of tetragonal zirconia to monoclinic zirconia in the hydrothermal degradation test causes degradation of the sintered body. The sintered body of the measurement example has a lower stabilizer content than the sintered body of the comparative measurement example but has a lower monoclinic fraction after the hydrothermal degradation test and is more resistant to degradation. The sintered body of the comparative measurement example before the hydrothermal degradation test had a monoclinic fraction of 0% and a tetragonal fraction of 70%, had a cubic phase as the remainder, and therefore had a residual tetragonal fraction (ΔT %) of 4%. Thus, almost all the tetragonal zirconia in the sintered body probably underwent a phase transition to monoclinic zirconia in the hydrothermal degradation test for 10 hours. In contrast, the sintered body of the measurement example before the hydrothermal degradation test had a tetragonal fraction of 94% and a monoclinic fraction of 6% and therefore had a residual tetragonal fraction (ΔT %) of 85%. Thus, the sintered body probably has a large amount of tetragonal zirconia that does not undergo phase transition even after the hydrothermal degradation test for 10 hours.

Measurement Example 2 (Residual Tetragonal Fraction)

The sintered bodies of Examples 1 and 13 and Comparative Examples 1 and 5 were mirror-polished and then immersed in hot water at 140° C. for 6 hours, and the residual tetragonal fraction was determined. The results are shown in the following table.

TABLE 5

| | Sintering temperature (° C.) | Composition Y$_2$O$_3$ (mol %) | Al$_2$O$_3$ (wt %) | Residual tetragonal fraction ΔT % |
|---|---|---|---|---|
| Example 1 | 1300 | 1.6 | 0 | 75% |
| Example 13 | 1400 | 1.6 | 0 | 69% |
| Comparative example 1 | 1450 | 2.0 | 0 | 13% |
| Comparative example 5 | 1500 | 2.0 | 0 | 12% |

TABLE 4

| | Y$_2$O$_3$ mol % | Monoclinic fraction After immersion for 6 hours | After immersion for 10 hours |
|---|---|---|---|
| Measurement example | 1.6 | 20% | 23% |
| Comparative measurement example | 3 | 67% | 68% |

In the sintered bodies of the measurement example and the comparative measurement example before the hydrothermal degradation test, the main phase of the crystal phase The sintered bodies of the examples have a residual tetragonal fraction of 65% or more and are less likely to undergo transformation from tetragonal zirconia to monoclinic zirconia than the comparative examples with a higher stabilizer content.

Measurement Example 3 (Residual Tetragonal Fraction)

The sintered bodies of Examples 2 to 4, 14 and 15 and Comparative Example 2 were mirror-polished and then immersed in hot water at 140° C. for 6 hours, and the residual tetragonal fraction was determined. The results are shown in the following table.

TABLE 6

| | Sintering temperature (° C.) | Composition Y$_2$O$_3$ (mol %) | Al$_2$O$_3$ (wt %) | Residual tetragonal fraction ΔT % |
|---|---|---|---|---|
| Example 2 | 1250 | 1.6 | 0.25 | 85% |
| Example 3 | 1300 | 1.6 | 0.25 | 82% |
| Example 4 | 1500 | 2.0 | 0.25 | 79% |
| Example 14 | 1350 | 1.6 | 0.25 | 67% |

TABLE 6-continued

| | Sintering temperature (° C.) | Composition Y₂O₃ (mol %) | Al₂O₃ (wt %) | Residual tetragonal fraction ΔT % |
|---|---|---|---|---|
| Example 15 | 1400 | 1.6 | 0.25 | 79% |
| Comparative example 2 | 1450 | 2.0 | 0.25 | 63% |

The sintered bodies of the example have a residual tetragonal fraction of 65% or more and are less likely to undergo transformation from tetragonal zirconia to monoclinic zirconia than the comparative examples. Furthermore, although Example 4 has the same stabilizer content as Comparative Example 2 and has a higher sintering temperature than Comparative Example 2, Example 4 has a higher residual tetragonal fraction.

Measurement Example 4 (Residual Tetragonal Fraction)

The sintered bodies of Examples 5 to 12 and 16 to 22 and Comparative Example 3 were mirror-polished and then immersed in hot water at 140° C. for 6 hours, and the residual tetragonal fraction was determined. The results are shown in the following table.

TABLE 7

| | Sintering temperature (° C.) | Composition Y₂O₃ (mol %) | Al₂O₃ (wt %) | GeO₂ (wt %) | SiO₂ (wt %) | Residual tetragonal fraction ΔT % |
|---|---|---|---|---|---|---|
| Example 5 | 1350 | 1.6 | 20 | 0 | 0 | 95% |
| Example 6 | 1300 | 1.6 | 20 | 0 | 0 | 91% |
| Example 7 | 1500 | 2.0 | 5 | 0 | 0 | 83% |
| Example 8 | 1250 | 1.6 | 0.5 | 0 | 0 | 82% |
| Example 9 | 1250 | 1.6 | 1 | 0 | 0 | 84% |
| Example 10 | 1250 | 1.6 | 0 | 0.25 | 0 | 76% |
| Example 11 | 1350 | 1.6 | 0 | 0 | 0.25 | 74% |
| Example 12 | 1200 | 1.6 | 0.25 | 0.25 | 0 | 75% |
| Example 16 | 1500 | 1.6 | 20 | 0 | 0 | 77% |
| Example 17 | 1500 | 1.6 | 20 | 0 | 0 | 87% |
| Example 18 | 1350 | 1.6 | 0.5 | 0 | 0 | 65% |
| Example 19 | 1350 | 1.6 | 1 | 0 | 0 | 74% |
| Example 20 | 1350 | 1.6 | 0 | 0.25 | 0 | 86% |
| Example 21 | 1250 | 1.6 | 0.25 | 0.25 | 0 | 79% |
| Example 22 | 1350 | 1.6 | 0.25 | 0.25 | 0 | 91% |
| Comparative example 3 | 1450 | 2.0 | 5 | 0 | 0 | 69% |

The sintered bodies of the examples have a residual tetragonal fraction of 70% or more and are less likely to undergo transformation from tetragonal zirconia to monoclinic zirconia than the comparative examples. Furthermore, the sintered body of Example 22 is a sintered body containing 0.5% by mass of alumina and germania in total as additive components. The sintered body of Example 22 was sintered at a higher temperature than the sintered body of Example 6 containing 20% by mass of alumina but showed a residual tetragonal fraction.

Furthermore, Examples 1, 3 and 6 (and Examples 5, 18 and 19) with the same sintering temperature and the same stabilizer content show that the residual tetragonal fraction tends to increase with the additive component (alumina) content.

Measurement Example 5 (Total Light Transmittance)

The total light transmittance was measured in the sintered bodies of Examples 2, 8, 9 and 14 and Comparative Example 2. The results are shown in the following table.

TABLE 8

| | Sintering temperature (° C.) | Al₂O₃ (wt %) | Total light transmittance (%) |
|---|---|---|---|
| Example 2 | 1250 | 0.25 | 34 |
| Example 8 | 1250 | 0.5 | 31 |
| Example 9 | 1250 | 1.0 | 26 |
| Example 14 | 1350 | 0.25 | 36 |
| Comparative example 2 | 1450 | 0.25 | 19 |

All the sintered bodies of the examples contained 0.2% or more by mass of the additive components but had a total light transmittance in the range of 25% to 40%. Examples 2 and 14 show that the total light transmittance increased with the sintering temperature. By contrast, the sintered body of Comparative Example 2 had a total light transmittance of less than 20% in spite of its higher sintering temperature.

Furthermore, the sintered body of Example 2 was processed to have a thickness of 0.2 mm, and the total light transmittance was measured in the same manner. The total light transmittance at a thickness of 0.2 mm was 46%. The sintered body of Comparative Example 2 was broken when processed in the same manner, and a sample with a thickness of 0.2 mm or less could not be prepared.

Measurement Example 6 (Linear Transmittance)

The sintered bodies of the examples were processed to a sample thickness of 0.09 mm. Samples with a sample thickness of 0.09 mm were prepared without cracking. The sintered bodies of the comparative examples had a defect, such as a crack or fracture, while processing and could not be processed to 0.2 mm.

Linear transmittance was measured in the sintered bodies with a sample thickness of 0.09 mm. The following table shows the linear transmittance of main examples.

TABLE 9

|  | Sintering temperature (° C.) | $Al_2O_3$ (wt %) | $GeO_2$ (wt %) | $SiO_2$ (wt %) | Average grain size (μm) | Linear transmittance (%) |
| --- | --- | --- | --- | --- | --- | --- |
| Example 1 | 1300 | 0 | 0 | 0 | 0.25 | 6.0 |
| Example 2 | 1250 | 0.25 | 0 | 0 | 0.17 | 7.1 |
| Example 3 | 1300 | 0.25 | 0 | 0 | 0.22 | 4.5 |
| Example 8 | 1250 | 0.5 | 0 | 0 | 0.22 | 5.1 |
| Example 11 | 1350 | 0 | 0 | 0.25 | 0.34 | 1.4 |
| Example 14 | 1350 | 0.25 | 0 | 0 | 0.28 | 2.1 |
| Example 20 | 1350 | 0 | 0.25 | 0 | 0.34 | 3.1 |
| Example 21 | 1250 | 0.25 | 0.25 | 0 | 0.26 | 7.0 |

Examples 2, 3 and 14 show that the linear transmittance increased with the sintering temperature. Furthermore, the sintered body of Example 1, which does not contain alumina, has a higher linear transmittance than Example 3, and the sintered body of Example 8 has a lower linear transmittance than Example 3. Furthermore, a comparison of Examples 11, 14, 20 and 21 shows that the linear transmittance depends on the type of additive agent.

Measurement Example 7 (Evaluation of Compounds)

The powders of Examples 2 and 3 were used to prepare compounds. More specifically, each of the powders was dried at 150° C. for 1 hour or more, and then the powder and an acrylic resin were kneaded at 160° C. in a kneader (apparatus name: Labo kneader mill TDR-3, manufactured by Toshin Co., Ltd.) to prepare a compound such that the powder constituted 85% by mass of the compound. After 15 minutes from the start of kneading, the torque (N·m) applied to the kneader was measured to evaluate the kneading property of the compound. A smaller torque indicates a compound that can be more easily kneaded, that is, a compound with a better kneading property.

Flowability was evaluated by measuring the flow rate of the compound sample with a flow tester. A general flow tester (apparatus name: Flow tester CFT500D, manufactured by Shimadzu Corporation) was used for the measurement, and the syringe was filled with the compound. The flowability was evaluated by applying a load to the compound under the following conditions and measuring the volume velocity ($cm^3$/s) of the compound ejected from the syringe. The measurement conditions are described below. A higher volume velocity indicates a compound that flows more easily in the molten state, that is, a compound with higher flowability.

Syringe area: 1 $cm^2$
Die hole diameter: 1 mm in diameter
Die length: 2 mm
Load: 50 kg
Measurement temperature: 160° C.
Compound density: 3.0 g/$cm^3$ In a comparative measurement example, a 3% by mole yttria-containing zirconia powder with a BET specific surface area of 15.0 $m^2$/g and an average particle size (median size) of 1.1 μm was evaluated in the same manner. The evaluation results of the compounds are shown in the following table. The powder of the comparative measurement example had a poor kneading property and could not be kneaded at 160° C. Thus, the kneading property of the comparative measurement example in the following table is the kneading property at 170° C.

TABLE 10

|  | BET specific surface area ($m^2$/g) | Torque (N·m) | Volume velocity ($cm^3$/s) |
| --- | --- | --- | --- |
| Example 2 | 15.1 | 14 | 0.15 |
| Example 3 | 10.3 | 8 | 0.35 |
| Comparative measurement example | 15.0 | 16 | 0.03 |

The powder of Example 3 with a lower BET specific surface area than the powder of the comparative measurement example had a better kneading property and higher flowability, particularly much higher flowability. Furthermore, although the powders of Example 2 and the comparative measurement example had almost the same BET specific surface areas, the powder of Example 2 had much higher flowability than the comparative measurement example. These results show that the powders of the examples also have advantages as compositions (compounds) composed of the powder and the resin.

The entire contents of the specification, claims and abstract of Japanese Patent Application No. 2019-084550 filed on Apr. 25, 2019, Japanese Patent Application No. 2019-142437 filed on Aug. 1, 2019, and Japanese Patent Application No. 2019-211944 filed on Nov. 25, 2019 are hereby incorporated by reference in the disclosure of the specification of the present disclosure.

The invention claimed is:

1. A sintered body comprising zirconia that contains a stabilizer and having a monoclinic fraction of 0.5% or more, prepared from a powder comprising a stabilizer and zirconia with a monoclinic fraction of more than 70%, wherein a crystallite size of monoclinic zirconia is more than 23 nm and 80 nm or less,
wherein the zirconia has a crystal phase containing monoclinic zirconia and tetragonal zirconia, and
wherein the powder contains no undissolved stabilizer.

2. The sintered body according to claim 1, wherein a ratio of an integrated intensity of an XRD peak corresponding to a (11−1) plane of monoclinic zirconia to an integrated intensity of an XRD peak corresponding to a (111) plane of the monoclinic zirconia is 0 or more.

3. The sintered body according to claim 1, wherein the stabilizer is at least one selected from the group consisting of yttria, calcia, magnesia and ceria.

4. The sintered body according to claim 1, wherein the stabilizer content is 1.0% by mole or more and less than 2.5% by mole.

5. The sintered body according to claim 1, wherein a fracture toughness value measured by a method conforming to an SEPB method specified in JIS R 1607 is 6 MPa·m$^{0.5}$ or more and 11 MPa·m$^{0.5}$ or less.

6. The sintered body according to claim 1, further comprising: at least one additive component selected from the group consisting of alumina, germania and silica.

7. The sintered body according to claim 1, wherein the additive component is alumina.

8. The sintered body according to claim 1, wherein the zirconia contains monoclinic zirconia, tetragonal zirconia, and cubic zirconia.

9. The sintered body according to claim 1, wherein a ratio of a tetragonal fraction after immersion treatment in hot water at 140° C. for 6 hours to a tetragonal fraction before the immersion treatment in hot water at 140° C. for 6 hours is 15% or more.

10. A method for producing the sintered body according to claim 1, comprising: using a powder that contains a stabilizer and zirconia with a monoclinic fraction of more than 70%, wherein a crystallite size of monoclinic zirconia is more than 23 nm and 80 nm or less,
wherein the zirconia has a crystal phase containing monoclinic zirconia and tetragonal zirconia, and
wherein the powder contains no undissolved stabilizer.

11. A powder comprising a stabilizer and zirconia with a monoclinic fraction of more than 70%, wherein a crystallite size of monoclinic zirconia is more than 23 nm and 80 nm or less,
wherein the zirconia has a crystal phase containing monoclinic zirconia and tetragonal zirconia, and
wherein the powder contains no undissolved stabilizer.

12. The powder according to claim 11, wherein the powder has a multimodal volumetric particle size distribution curve.

13. The powder according to claim 11, wherein the stabilizer is at least one selected from the group consisting of yttria, calcia, magnesia and ceria.

14. The powder according to claim 11, wherein the stabilizer content is 1.0% by mole or more and less than 2.5% by mole.

15. The powder according to claim 11, further comprising: at least one additive component selected from the group consisting of alumina, germania and silica.

16. The powder according to claim 15, wherein the additive component content is 0.1% or more by mass and 30% or less by mass.

17. The powder according to claim 11, wherein a BET specific surface area is 6 m$^2$/g or more and less than 20 m$^2$/g.

18. The powder according to claim 11, wherein a median particle size is 0.05 μm or more and 0.3 μm or less.

19. A member comprising the sintered body according to claim 1.

* * * * *